Mar. 27, 1923.
J. DEMAREST.
HEATER FOR BUILDINGS.
FILED NOV. 28, 1922.
1,449,384.
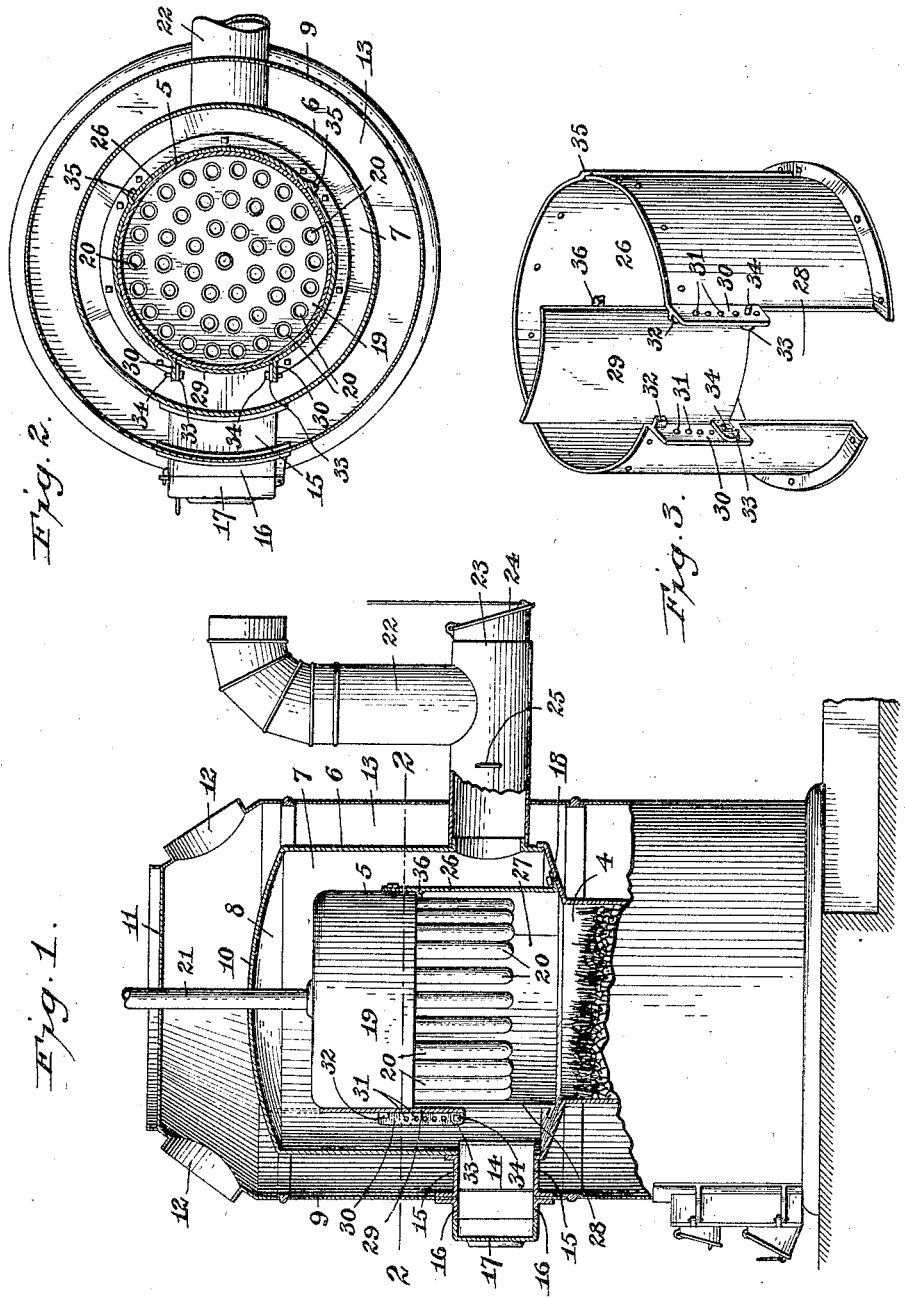
Inventor:
John Demarest,
By Emil Kuchar
Attorney
Witness:
J. J. Oberst, Patented Mar. 27, 1923.

1,449,384

UNITED STATES PATENT OFFICE.

JOHN DEMAREST, OF BUFFALO, NEW YORK.

HEATER FOR BUILDINGS.

Application filed November 28, 1922. Serial No. 603,845.

*To all whom it may concern:*

Be it known that I, JOHN DEMAREST, a citizen of the United States, residing at Buffalo, in the county of Erie and State of New York, have invented certain new and useful Improvements in Heaters for Buildings, of which the following is a specification.

My invention relates to improvements in heaters for heating the interior of buildings, and more especially to heaters of the type known as combined hot-air and water heaters.

The primary object of my invention is the production of a heater of this type in which fresh air heat and steam or hot water are utilized for heating purposes, and wherein all the heat units possible from the fuel burned, are extracted and used first to heat water and then to release the same for hot-air heating purposes, the steam generated or water heated being also utilized for heating purposes.

Another object of my invention is to provide a heater of this type in which the proportion of steam generated or water heated and utilized for heating purposes may be varied with respect to the air heating capacity of the heater in accordance with the requirements of a building, or to meet changing conditions by reason of additions made to a building; it being the intention to utilize hot air, for example, to heat the main rooms of a dwelling or other building in which radiators are considered undesirable, and to direct both hot air and steam or hot water to distant or exposed portions of the building; the steam or hot water, as the case may be, being delivered into a suitable radiator, preferably located at the distant point, while a hot air flue is directed to said radiator and both the hot air passing through said flue and the heat radiated from said radiator are released into the room to be heated, through a suitable register; the hot air directed through said tube being heated by commingling with the heat radiated from said radiator and by coming in direct contact with said radiator.

With the above and other objects to appear hereinafter, the invention therefore consists in providing means within the heater for assuring a positive distribution of heat for distant or exposed rooms, and for increasing the steam generating power of the heater when it is found that distant or exposed rooms of a building are not heated to the desired degree, or in conformity with those in other portions of the house.

The invention further consists in providing a heater with an internal chamber, or an enclosed combustion chamber as it may be termed, and equipping the latter with means to diminish or enlarge the escape opening therein for the products of combustion; and further to cause the products of combustion to first act against the boiler for heating the water therein in a controlled manner, and then utilizing the escaping products of combustion for heating fresh air passing through the heater.

The invention further consists in the novel features of construction and in the arrangement and combination of parts to be hereinafter described and more particularly pointed out in the subjoined claims.

In the drawings:—

Fig. 1 is a sectional elevation of a heater or furnace embodying my invention in what I now consider its preferred form, the lower portion of the heater or furnace and a portion of the draft pipe being shown in elevation.

Fig. 2 is a horizontal section taken on line 2—2, Fig. 1.

Fig. 3 is a perspective view of the enclosing wall of the combustion chamber with its adjustable gate or door.

As above stated, an essential feature of my invention is to provide the heater or furnace with an enclosed combustion chamber, and this is illustrated in the accompanying drawings as applied to a heater or furnace of the type illustrated in my prior Patent No. 999,756, dated August 8, 1911, and which heater or furnace includes a fire pot 4 beneath which the usual ash pit is located, a steam generator or boiler 5 being situated directly above the fire pot, said generator or boiler receiving support in any practicable manner. An enclosing wall 6 surrounds said steam generator or boiler and the space directly above the fire pot to furnish a heating chamber 7 having a dome 8, and an exterior casing 9 surrounds the heating chamber, the fire pot and part of the ash pit, and extends upwardly above the top wall 10 of the heating chamber, said casing 9 being closed at the top by a wall 11 and having hot air outlets 12 to which flues are connected and which may be led to the various parts of a building to be heated.

The space above and around the heating chamber and also around the fire pot 4 serves as a hot air chamber 13.

Opening through the outer casing 9 at the front thereof and fitting an opening at the front of the enclosing wall 6, or heater casing as it may be termed, is a fuel supply passage 14 enclosed by suitable walls spanning the space between the outer casing 9 and said heater casing, and by suitable walls 16 extending outwardly from said outer casing 9. The front end of this passage is closed by the usual door 17. Fuel is therefore introduced into the fire pot through this passage or opening 14, which is entirely shut off from the hot air chamber 13 surrounding the heater casing 6. The heater casing 6 is shown as supported by an outwardly and upwardly-directed annular portion 18 extending from the walls of the fire pot at their upper ends.

The steam generator or boiler comprises a cylindrical casing 19 closed at the top and bottom and having its lower wall spaced a considerable distance above the fire pot and drop tubes 20 having their upper ends fastened into the lower wall of said cylindrical chamber in any approved manner and directed therefrom toward the burning fuel.

Secured in the top wall of the steam generator, and more specifically in the top wall of the cylindrical chamber 19 of said generator or boiler, is a steam pipe 21 which may be led to distant parts of a building for attachment to suitable radiators (not shown) situated in chambers having openings closed by registers, said radiator-containing chambers having hot air flues connected to the hot air space of the heater or furnace leading thereto so that the hot air from the heater or furnace which may become somewhat cooled in passing through long stretches of flues will be brought in contact with said radiators and become heated, and the heat radiating from said radiators with the hot air passing through said flues and in contact with such radiators will escape out through registers for heating rooms located at distant points from the heater or furnace, or rooms that are more or less exposed, as will be clearly understood by those skilled in the art to which this invention relates.

The pipe 21 may, in some instances, be used as a hot water pipe, but in such cases I would prefer to employ a different type of boiler. A return pipe connected to the boiler in any approved manner may be directed to the various radiators for the return of the water of condensation, but as this forms no part of my invention, it is not believed necessary to illustrate this in the drawings.

22 designates a draft pipe adapted for connection with a chimney. This pipe has connection with the heater casing 6, preferably at a low point and it is provided with an extension 23 equipped with a check damper 24 in the usual manner. It also has the usual draft damper 25.

The space directly above the fire pot I enclose with a parti-circular wall 26 fastened at its lower end to the upwardly and outwardly directed annular portion 18 of the fire pot, and also at its upper end to the cylindrical chamber 19 of the steam generator or boiler. This enclosure provides an enclosed combustion chamber 27 and it has at its front end an opening 28 adapted to be partly closed or completely opened by means of a gate or vertically-slidable door 29, and for convenience in adjusting this gate or door the enclosing wall of the combustion chamber at the sides of the opening 28 has outstanding flanges 30, each provided with a vertical series of pin holes 31. These flanges are provided at their upper ends with retainer lugs 32 and the slidable gate or door 29 has outwardly extending lugs 33 at its lower end adapted to lie against the inner faces of the outstanding flanges 30, each lug having an opening therein through which a headed pin 34 is passed, the head of the pin bearing against the inner side of the lug. These pins extend through one of the series of openings 31 in each flange 30, and after raising or lowering the slide gate or door, retain the latter in desired position.

It is to be noted that the slide gate or door is curved in cross section to conform to the enclosing wall 26, and particularly to the cylindrical chamber 19 of the steam generator or boiler against which the inner surface of said gate or door slides, as clearly indicated in Fig. 1. It may therefore be considered as a movable portion or section of the enclosing wall of the combustion chamber. While the lower end of the gate or door is retained in position by the lugs 33 and pins 34, outward tilting movement of the upper portion of said gate is prevented by the lugs 32 and inward tilting motion by reason of said door bearing against the peripheral surface of the steam generator or boiler. Said gate or door is therefore guided for vertical movement by the steam generator or boiler and the lugs 32 extending from the upper ends of the flanges 30

In Fig. 1 of the drawing, the gate is shown in its lowermost position and in this position the opening 28 beneath the gate is of greater area than the draft opening in the heating chamber 6 leading to the draft pipe 22, so that the raising or lowering of the gate or door does not in any manner affect the draft of the heater or furnace.

It will be apparent therefore that the products of combustion from the burning fuel, rise and move in contact with the drop tubes and the under surface of the steam generator or boiler and then pass out through the firing opening 28 underneath the slide gate or door 29, the heat rising upwardly into the dome 8 of the heating chamber and traveling laterally in opposite directions around the combustion chamber so as to effectively heat the space 13 between said heating chamber and the exterior wall of the heater or furnace, the degree of draft being regulated by the damper 25 or by the check damper 24, as may be found desirable.

Owing to the fact that the firing opening 28, which also serves as an escape opening for the products of combustion from the combustion chamber is larger than the draft opening in the draft pipe 22 at the point where the latter is connected to the heating chamber 7, the raising or lowering of the slide gate or door 29 does not materially change the air heating power of the heater or furnace; but it will be plain from Fig. 1 that with the gate or door lowered to its lowermost position, the escape of the products of combustion from the combustion chamber is somewhat retarded or, as it may be termed, momentarily trapped to more thoroughly heat the water in the steam generator or boiler; whereas when the slide gate or door 29 is elevated, the products of combustion have a freer escape into the heating chamber 7 and consequently reduce the steaming capacity of the generator or boiler.

The wall proper, or the fixed portion or section of the wall of the combustion chamber may for convenience be constructed of a plurality of parts, as indicated at 35, Fig. 3, or it may be made integral, as desired; but in either case I prefer to provide said wall with inwardly-projecting supporting lugs 36 against which the bottom of the steam generator or boiler rests, while that portion of the wall 26 of said combustion chamber above said lugs 36 surrounds said steam generator and is secured thereto.

When elevating the slide gate or door, the upper end thereof extends upwardly into the dome to a degree corresponding to the degree of enlargement of the firing opening 28 beneath said gate or door, and thus that portion of said gate or door extending above the steam generator or boiler serves somewhat as a baffle, since the products of combustion escaping through the opening 28 and traveling upwardly are compelled to take a course laterally and pass around either side of said gate or door, except when the degree of projection above the steam generator or boiler is less than the space between the latter and the dome wall 10 of the heater chamber, in which case portions of the products of combustion rising directly from the escape opening 28 may pass upwardly and rearwardly over the upper edge of the door while other portions are directed toward and around the side edges of the same. The draft opening of said heating chamber being at the rear and at a low point necessarily creates a draft around the combustion chamber and around the steam generator or boiler, and consequently portions of the products of combustion may travel outwardly through said draft opening without rising into the dome 8 of said heating chamber.

It will be apparent from the foregoing that with the slide gate or door 29 positioned as shown in Fig. 1, the distant or exposed rooms heated by means of steam or hot water, as the case may be, and hot air, may become overheated or at least heated to beyond a degree desired, in which event the gate or door may be elevated and the steam generating capacity of the device reduced. It is desirable to install a boiler having a heating capacity which will probably heat all rooms of a building when the slide gate or door is somewhat elevated, and in the event it is then found that the distant or exposed rooms are not properly heated, the lowering of the gate or door 29 will assure increased steam capacity, or assure a more effective heating of the water in the event of a water heating system being used; or the circumstances may be such that the heating of distant or exposed rooms can be effected by positioning the slide gate or door at a comparatively high point, in which event provision is made for heating additional rooms or building parts that may be added to the original building structure. In such cases, the slide gate or door 29 could be lowered to assure a greater steam generating capacity for heating the hot air at the point of escape into the added rooms.

In the event of hot water being desired in lieu of steam heat, it may be desirable to employ a boiler of a somewhat different type, but manifestly the combustion chamber will be enclosed between the fire pot and the boiler so as to be independent and separate from the heating chamber 7, as above specified. Where in the claims, reference is made to a water heater, it is intended to be considered as a boiler capable of properly heating water for heating purposes, or for generating steam.

Having thus described my invention, what I claim is:—

1. A combined hot air and water heater having a heating chamber, a boiler centrally within said heating chamber and spaced from the top wall thereof, a fire pot beneath said boiler, a draft pipe connected to said heating chamber, a hot air chamber surrounding said heating chamber and having provision for connection of hot air flues thereto, an enclosed combustion chamber having an opening for the escape of the products of combustion, and means for regulating retardation of the products of combustion prior to escaping through said opening.

2. A combined hot air and water heater, comprising an outer chamber having means for connection of hot air flues thereto, a second chamber within said outer chamber spaced from the walls of the latter and having a fuel feed opening and a draft opening, a draft pipe connected with said draft opening, a boiler within said second chamber spaced from the walls thereof, a fire pot beneath said boiler, and a wall extending upwardly from said fire pot to said boiler to form an enclosed combustion chamber within said second chamber, said combustion chamber having an opening therein for the escape of products of combustion and for the introduction of fuel into the fire pot.

3. A combined hot air and water heater, comprising an outer casing having provision for connection of hot air flues thereto and having also a fuel feed opening, a fire pot in the lower portion of said outer casing, a second casing within said outer casing receiving support from said fire pot and of larger diameter than the latter, said second casing having a fuel feed opening alined with the fuel feed opening of said outer casing and a draft opening at a low point diametrically opposite its fuel feed opening, a boiler within said second casing having a body portion and drop tubes positioned above said fire pot and spaced from the walls of said second casing, and an enclosed combustion chamber within said second casing and between said boiler and fire pot, said enclosed combustion chamber having an opening for the escape of the products of combustion therefrom alined with said fuel feed opening.

4. A combined hot air and water heater comprising a fire pot, a boiler situated above said fire pot, an enclosed combustion chamber between said fire pot and boiler having an opening for the escape of the products of combustion, a heating chamber surrounding said boiler and combustion chamber and having the walls thereof spaced from both and a draft opening in its wall positioned relatively to the opening of said combustion chamber to cause the products of combustion to pass through said heating chamber in a circuitous manner, a hot air chamber surrounding said heating chamber and spaced from the walls of the same, said hot air chamber having means for connection of hot air flues thereto, and a draft pipe extending through said hot air chamber and connected to the draft opening of said heating chamber.

5. A combined hot air and water heater having a heating chamber, a boiler centrally located therein, a fire pot beneath said boiler, an enclosed combustion chamber between the two having an escape opening for the products of combustion, a vertically slidable gate adapted to increase or diminish the size of said escape opening, and means for retaining said gate in desired position.

6. A combined hot air and water heater having a heating chamber, a boiler centrally located therein and spaced from the top wall of said heating chamber, a fire pot beneath said boiler, a parti-circular wall surrounding the space between said boiler and fire pot to provide an enclosed combustion chamber with an opening for the escape of the products of combustion, and a gate vertically slidable between the ends of said wall and in contact with the boiler, said gate being adapted to be elevated to position its upper end portion above the top of said boiler while enlarging the escape opening of said combustion chamber.

7. A combined hot air and water heater having a heating casing, a fire pot supporting said heating casing, a boiler above said fire pot comprising a hollow body portion and drop tubes, a wall carried by said fire pot and having its upper end secured to the hollow body portion of said boiler and partly surrounding said drop tubes to form an enclosed combustion chamber between said boiler and fire pot, a vertically slidable gate adapted to partly close the opening left by said wall, and means for retaining said gate in desired position.

8. A combined hot air and water heater, comprising an outer casing, a second casing within said outer casing and spaced from the walls thereof, a fire pot, means for feeding fuel through said casings to said fire pot, a drop tube boiler situated above said fire pot, a wall surrounding the space between said boiler and fire pot and having a slidable section providing an escape opening for the products of combustion and capable of being enlarged or reduced in size upon movement of said slidable section, and a draft pipe connected to said second casing.

9. A combined hot air and water heater, comprising an outer casing having means at its upper end for connection of hot air flues thereof and having also a fuel feed opening, a fire pot in the lower portion of said casing, a second casing carried by said fire pot and spaced from the walls of said outer casing, said second casing having a fuel feed opening alined with the fuel feed opening of said outer casing and having a draft opening at a low point, a wall rising from said fire pot and forming a combustion chamber, a boiler above said fire pot partly surrounded by said wall, said wall forming an opening for said combustion chamber in line with said fuel feed openings for the introduction of fuel to said fire pot and for the escape of the products of combustion from said combustion chamber, said wall having spaced flanges provided each with a vertical series of openings and lugs extending toward each other from the upper ends of said flanges, a slidable member in contact with said boiler and said lugs and having lugs at its lower end in sliding contact with said flanges, pins passed through said last-mentioned lugs and through openings in said flanges, and a draft pipe extending through said outer casing and connected to the draft opening of said second casing.

In testimony whereof I affix my signature.

JOHN DEMAREST.